C. O. HEMBREE.
STARTING DEVICE FOR MOTOR VEHICLE ENGINES.
APPLICATION FILED JULY 6, 1915.
1,170,812.
Patented Feb. 8, 1916.
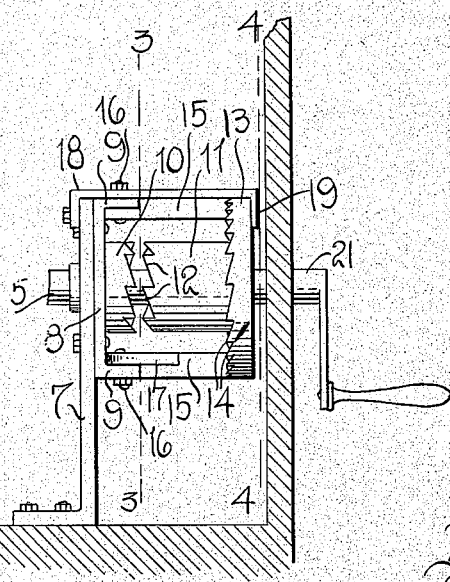
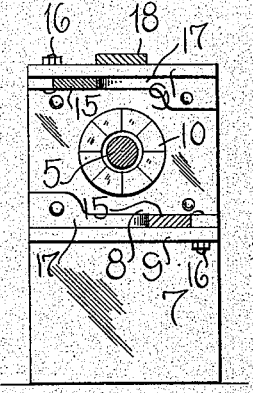
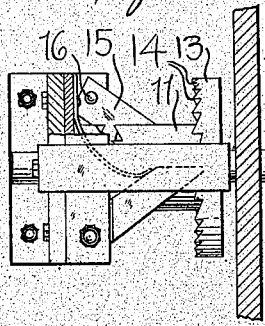
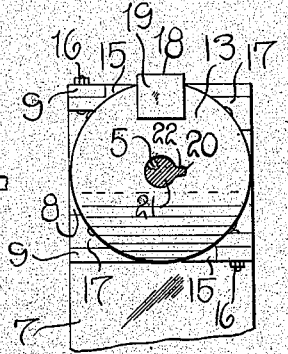
Inventor
C. O. HEMBREE
By Watson E. Coleman
Attorney

UNITED STATES PATENT OFFICE.

CHARLES O. HEMBREE, OF ASHER, OKLAHOMA.

STARTING DEVICE FOR MOTOR-VEHICLE ENGINES.

1,170,812. Specification of Letters Patent. Patented Feb. 8, 1916.

Application filed July 6, 1915. Serial No. 38,283.

*To all whom it may concern:*

Be it known that I, CHARLES O. HEMBREE, a citizen of the United States, residing at Asher, in the county of Pottawatomie and State of Oklahoma, have invented certain new and useful Improvements in Starting Devices for Motor-Vehicle Engines, of which the following is a specification, reference being had to the accompanying drawings.

This invention relates to an improved starting device for motor vehicle engines and has for its primary object to provide means for cranking the engine to give the same the initial starting impulse, which will obviate all liability of injury to the operator by reverse movement or kicking of the crank when the engine shaft is suddenly driven by the explosion of the engine.

The invention has for a more particular object to provide a bearing or support for the engine shaft, a clutch disk fixed on the shaft, a sleeve loosely engaged on the shaft and provided with a clutch to engage said clutch disk, and spring-pressed pawls coöperating with a ratchet on one end of the sleeve to prevent reverse movement thereof and also normally hold the clutch on the sleeve out of engagement with the clutch on the engine shaft.

The invention has for an additional object to provide a very simple and effective device for the above purpose and one which may be readily applied to the ordinary motor vehicle engine at nominal cost.

With the above and other objects in view, my invention consists in the novel features of construction, combination and arrangement of parts to be hereinafter more fully described, claimed and illustrated in the accompanying drawing, in which, Figure 1 is a side elevation illustrating the preferred embodiment of my invention; Fig. 2 is a top plan view partly broken away; Fig. 3 is a section taken on the line 3—3 of Fig. 1; and Fig. 4 is a section taken on the line 4—4 of Fig. 1.

Referring in detail to the drawing, 5 designates the engine shaft having the usual fly wheel fixed thereon. The engine shaft is supported in an upright 7 mounted upon the machine frame, and to one side of said upright the bearing plate 8 is fixed, said plate being provided upon its upper and lower ends with laterally extending flanges 9. Upon the end of the shaft a clutch disk 10 is fixed, said disk engaging the face of the bearing plate 8.

A sleeve 11 is loosely mounted upon the engine shaft 5 and one end of this sleeve is provided with the clutch teeth indicated at 12, for engagement with the confronting teeth on the clutch disk 10. On the other end of said sleeve, the flange 13 is formed, and said flange is provided upon its inner face with an annular series of ratchet teeth 14. Upon the upper and lower flanges 9 of the bearing plate 8 and on relatively opposite sides of the engine shaft, the pawls 15 are pivotally mounted, as at 16. These pawls are normally held yieldingly in engagement with the ratchet teeth 14 by means of the leaf spring 17. One end of a horizontal bar 18 is fixed to the upright 7 and the other end of said bar is flanged or turned downwardly, as at 19, to limit the longitudinal movement of the sleeve 11 on the engine shaft in one direction. The clutch teeth on this sleeve are normally held out of engagement with the teeth on the disk 10 by the spring pressed pawls 15, said pawls acting against the ratchet flange on the sleeve and forcing said flange into contact with the end 19 of the bar 18. At one end of the bore in the sleeve 11, a keyway 20 is formed, and this keyway is adapted to receive the key or lug 22 on the end of the crank 21.

In the use of my invention, it will be understood that when it is desired to start the engine, the end of the crank is engaged in the sleeve 11 and said sleeve forced inwardly against the action of the spring pressed pawls 15 until the clutch on the end of the sleeve engages the clutch disk 10. The crank is now turned from left to right, and from reference to Fig. 2, it will be seen that the toothed edge 14 of the flange 13 will slip over the ends of the pawls, thus forcing the same inwardly against the action of the springs 17. When, however, the charge is ignited there is back firing of the engine, the reverse rotation of the clutch disk 10 to the direction in which the sleeve 11 is being turned, tends to reverse the rotation of said sleeve and the crank handle connected thereto. The pawls 15, however, engaging the teeth 14 on the flange 13, prevent such reverse turning movement of the sleeve 11 and the springs 17 acting upon said pawls, cause the same to force the clutch sleeve 11 away from the disk 10 so that there will be no reverse rotation of said sleeve on the crank handle 21, thus obviating liability of injury to the operator, as will be readily understood. The pawls 15 remain at all times in engagement with the teeth on the flange 13, and if the sleeve were not locked against reverse rotation by said pawls, it is readily seen that, although the sleeve may move longitudinally out of engagement with the clutch 10, it might, nevertheless, be rapidly rotated in a reverse direction by the clutch disk 10 at the instant back firing of the engine occurs.

From the foregoing description, taken in connection with the accompanying drawing, it will be seen that the construction, manner of operation and several advantages of my invention will be clearly and fully understood. The starting device is quite simple in its construction and may be readily applied to the ordinary motor vehicle at small cost. By means of the same, all possibility of injury to the operator is obviated and the engine may be easily and quickly started in operation.

While I have shown and described the preferred form and arrangement of the several elements employed, it is to be understood that the device is susceptible of considerable modification therein and I, therefore, reserve the privilege of resorting to all such legitimate changes as may be fairly embodied within the spirit and scope of the invention as claimed.

Having thus fully described my invention, what I desire to claim and secure by Letters Patent is:—

The combination with an engine shaft, of an upright in which said shaft is journaled, a clutch disk fixed upon said shaft, a sleeve loosely mounted upon the engine shaft having teeth on one end to engage the teeth of the clutch disk, said sleeve being provided with an annular flange on its other end having ratchet teeth on one face, a crank adapted to be connected to said sleeve to move the same into locking engagement with the clutch disk and rotate the engine shaft and sleeve in one direction, spring pressed pawls mounted upon the upright at one of their ends on opposite sides of said clutch disk and having their free ends engaged with the ratchet teeth on said flange, said pawls acting against the flange to force the sleeve out of locking engagement with the clutch disk upon the reverse turning movement of the engine shaft, and a bar fixed at one of its ends to the upright and extending longitudinally of said sleeve, the other end of said bar being formed with an angularly disposed stop for engagement by the flange on said sleeve to limit the movement of the sleeve to its inoperative position.

In testimony whereof I hereunto affix my signature in the presence of two witnesses.

CHARLES O. HEMBREE.

Witnesses:
GEORGE TINKLE,
CHAS. BURTON.

Copies of this patent may be obtained for five cents each, by addressing the "Commissioner of Patents, Washington, D. C."